(12) United States Patent
Zhang et al.

(10) Patent No.: US 10,104,729 B2
(45) Date of Patent: Oct. 16, 2018

(54) LED DRIVER CIRCUIT, AND LED ARRANGEMENT AND A DRIVING METHOD

(71) Applicant: PHILIPS LIGHTING HOLDING B.V., Eindhoven (NL)

(72) Inventors: Hui Zhang, Shanghai (CN); Dennis Johannes Antonius Claessens, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/577,555

(22) PCT Filed: May 25, 2016

(86) PCT No.: PCT/EP2016/061832
§ 371 (c)(1),
(2) Date: Nov. 28, 2017

(87) PCT Pub. No.: WO2016/189049
PCT Pub. Date: Dec. 1, 2016

(65) Prior Publication Data
US 2018/0177009 A1    Jun. 21, 2018

(30) Foreign Application Priority Data

May 28, 2015  (WO) ................ PCT/CN2015/080043
Oct. 29, 2015  (EP) ..................................... 15192086

(51) Int. Cl.
H05B 33/08      (2006.01)
H02M 3/33       (2006.01)
(Continued)

(52) U.S. Cl.
CPC ...... *H05B 33/0815* (2013.01); *H02M 3/3381* (2013.01); *H02M 3/33507* (2013.01)

(58) Field of Classification Search
CPC ................ H05B 33/08; H05B 33/0809; H05B 33/0815; H05B 33/0848; H05B 33/0884;
(Continued)

(56) References Cited

U.S. PATENT DOCUMENTS 5,515,256 A    5/1996  Yokoyama
6,529,392 B2   3/2003  Nishida et al.
(Continued)

*Primary Examiner* — Jimmy Vu
(74) *Attorney, Agent, or Firm* — Akarsh P. Belagodu

(57) ABSTRACT

The invention provides a driver circuit for driving an LED arrangement which uses a switch mode power converter, for example a flyback ringing choke converter, which comprises a main switch (e.g. bipolar transistor) and a sub-circuit for generating a current for the control terminal of the main switch. The sub-circuit in some examples makes use of an auxiliary winding as a voltage supply, and further comprises a ramp circuit for generating a ramp voltage from the voltage supply and a voltage follower, such as a control transistor, connected between the voltage supply and the control input of the main switch. By ramping up the current of the main switch, the losses arising as a result of the current flowing to the control input of the main switch are reduced. One set of examples makes use of a flyback ringing choke converter, which enables low cost implementation and good efficiency. The driver is able to receive a wide range of input voltages, by ensuring that the power loss is kept low. In particular, by ramping up the control current of the main switch, the losses arising as a result of the current flowing are reduced.

15 Claims, 4 Drawing Sheets

(51) Int. Cl.
*H02M 3/338* (2006.01)
*H02M 3/335* (2006.01)

(58) Field of Classification Search
CPC .......... H05B 33/0896; H05B 33/0863; H05B 37/02; H05B 37/029; H05B 37/0254; H02M 3/33507; H02M 3/3381
USPC ....... 315/151–153, 158, 291, 297, 307, 308, 315/312
See application file for complete search history.

(56) References Cited

U.S. PATENT DOCUMENTS

| | | |
|---|---|---|
| 6,798,671 B1 | 9/2004 | Sakai |
| 7,433,208 B2 | 10/2008 | Nishida et al. |
| 7,855,540 B2 | 12/2010 | Matthews |
| 2013/0121049 A1* | 5/2013 | Shi .................... H02M 3/33507 363/89 |
| 2016/0111961 A1* | 4/2016 | Balakrishnan .... H02M 3/33507 363/21.12 |

* cited by examiner

LED DRIVER CIRCUIT, AND LED ARRANGEMENT AND A DRIVING METHOD

CROSS-REFERENCE TO PRIOR APPLICATIONS

This application is the U.S. National Phase application under 35 U.S.C. § 371 of International Application No. PCT/EP2016/061832, filed on May 25, 2016, which claims the benefit of International Application No. PCT/CN2015/080043, filed on May 28, 2015 and European Patent Application No. 15192086.5, filed on Oct. 29, 2015. These applications are hereby incorporated by reference herein.

FIELD OF THE INVENTION

This invention relates to LED-based lighting.

BACKGROUND OF THE INVENTION

LED-based (retrofit) lamps are used more and more in home buildings and offices. Besides their high efficiency they also attract consumers due to new design features, different color temperatures, dimming ability etc.

To fit LED lighting to existing mains lighting fixtures, each LED light unit makes use of a converter circuit, for converting the AC mains into a DC drive signal, and also for reducing the voltage level.

The converter circuit typically comprises a rectifier and a switch mode power converter. One example of switch mode power converter is a ringing choke converter (RCC) based power converter. An RCC based buck converter is a typical self-oscillation converter in which the cyclic operation of the switching is self-controlled, and is widely used as a low cost LED driver. Other examples of the power converter are IC-based converters.

Current drivers are generally designed to operate with a specific mains input, generally 120V or 230V mains input voltage. There are now increasing demands for more flexible systems which can operate with different mains voltages, such as any AC input voltage between 120 and 277 V.

To provide a driver which can function over this input voltage range, designs are based on a professional IC with a MOSFET transistor control. This gives rise to a high system cost.

There is therefore a need for a lower cost LED driver suitable for a wide range of input mains voltages, and preferably of low cost, such as based on a self-oscillation architecture, such as an RCC architecture.

In a typical self-oscillation converter, the switch is controlled by an oscillated element such as an inductor. More specifically, the control terminal of the switch is provided with current/voltage by the oscillated element.

SUMMARY OF THE INVENTION

In the above typical self-oscillation converter, the power loss in driving the switch becomes higher if the oscillated element provides excessive current/voltage. This problem occurs more often when the converter is used with a wide input voltage range such as universal mains.

To address at least one of these concerns, the invention is defined by the claims.

According to an aspect of the invention, there is provided a driver circuit for driving an LED arrangement with a current-driven main switch and a sub-circuit for driving the main switch, the sub-circuit comprising: a supply adapted for providing a supply voltage; a ramp circuit connected to the supply, wherein said ramp circuit comprises a first capacitor adapted to be charged by said supply voltage; a voltage follower connected to said first capacitor and adapted for providing a linearly varied driving voltage that follows a linearly varied voltage on said first capacitor as said first capacitor is being charged by said supply voltage; and a voltage to current conversion unit between said voltage follower and the control terminal of the main switch, for providing the control terminal of the main switch with a linearly varied driving current that depends on the linearly varied driving voltage as said capacitor is being charged by said supply voltage.

In this aspect, the driving current of the main switch is a linearly varied driving current. This means the current increases proportionally with the voltage, thus the power loss from the voltage to current conversion unit is less.

In one set of examples, the driver circuit comprises a flyback ringing choke switch mode power converter. The switch mode power converter then comprises:
the main switch which comprises a main transistor;
a primary winding in series with the collector-emitter of the main transistor;
a secondary winding which forms an inductor of a flyback output stage;
and wherein the sub-circuit for driving the main switch comprises:
a base drive circuit which comprises an auxiliary winding coupled to said primary winding as said supply, the base drive circuit being adapted to generate a base current for the main transistor.

The driver circuit may further comprise a rectifier for rectifying a mains input signal to produce a rectified signal between a DC line and a ground line.

This driver makes use of a flyback ringing choke converter, which enables low cost implementation and good efficiency. The driver is able to receive a wide range of input voltages, by ensuring that the power loss is kept low. In particular, by ramping up the base current of the main converter transistor, the losses arising as a result of the current flowing to the base of the main transistor are reduced.

The base drive circuit may comprise the ramp circuit for generating a ramp voltage from the auxiliary winding voltage, and the voltage follower, which comprises a control transistor connected with its collector-emitter between the auxiliary winding and the base of the main transistor, with the ramp voltage applied to the base of the control transistor.

The driver circuit for example further comprises a base resistor in series between the control transistor and the base of the main transistor. This component is the primary cause of power dissipation in the circuit.

A base capacitor may be provided in parallel with a base diode, with the parallel combination between the control transistor and the base of the main transistor.

The base capacitor enables the main transistor to enter a saturation status quickly on start up and also enables fast switch off of the main transistor. The base diode is used to clamp the voltage across the base capacitor which thus increases the base current of the main transistor.

The ramp circuit may comprise a series first resistor and first capacitor, with the first resistor connected at a first terminal to the auxiliary winding and at a second terminal to a first terminal of the first capacitor, wherein the second terminal of the first resistor is connected to the base of the control transistor. This defines a capacitor charging circuit, which thus converts a current into a ramp voltage.

The second terminal of the first capacitor may be connected through a second resistor to ground and through a first diode to ground. This second resistor functions as a capacitor discharge circuit, so that after the ramp has been used to turn on the main transistor, the circuit is reset. The first diode is used as a charging path for the first capacitor rather than the second resistor since the second resistor has a high resistance value. The first capacitor may be in parallel with a Zener diode for preventing the first capacitor from being overcharged.

A second diode may be in parallel with the series combination of the control transistor and the base resistor.

This diode plays a role in the fast switch off of the main transistor. The base charge of the main transistor Q1 is depleted via the base capacitor, the second diode and the auxiliary winding.

The invention also provides an LED circuit comprising:
a driver circuit as defined above; and
an LED arrangement connected to the driver circuit.

Examples in accordance with another aspect of the invention provide a method of driving an LED arrangement, comprising:
operating a current-driven main switch of a switch mode power converter, using a start-up resistor between a DC power line and the control input of the main switch and using a sub-circuit to generate a current for the control input of the main switch,
wherein the method comprises, within the sub-circuit, generating a ramp voltage from a supply voltage using a ramp circuit which comprises a first capacitor adapted to be charged by the supply voltage;
applying the ramp voltage to a voltage follower to provide providing a linearly varied driving voltage that follows a linearly varied voltage on said first capacitor as said capacitor is being charged by the supply voltage; and
converting the voltage to current thereby providing the control terminal of the main switch with a linearly varied driving current that depends on the linearly varied driving voltage as said capacitor is being charged by said supply voltage.

The method may comprise operating a flyback ringing choke switch mode power converter, wherein the supply voltage is provided by an auxiliary winding.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a driver circuit for driving an LED arrangement which uses a switch mode power converter, for example a flyback ringing choke converter, which comprises a main switch (e.g. bipolar transistor) and a sub-circuit for generating a current for the control terminal of the main switch. The sub-circuit in some examples makes use of an auxiliary winding as a voltage supply, and further comprises a ramp circuit for generating a ramp voltage from the voltage supply and a voltage follower, such as a control transistor, connected between the voltage supply and the control input of the main switch. By ramping up the current supplied to the main switch control input, the losses arising as a result of the current flowing to the control input of the main switch are reduced.

The invention will be explained with reference to one preferred type of switch mode power converter; the ringing choke converter (RCC). The invention may be applied to other self-oscillating switch mode power converters, or indeed to other types of switch mode power converter such as pulse width modulation controlled converters. The RCC is of particular interest as it provides a low cost implementation, but the concept underlying the invention, which relates to the ramped turn on of the main switch of the converter as a current reducing measure, may be applied more generally.

Figure 1:
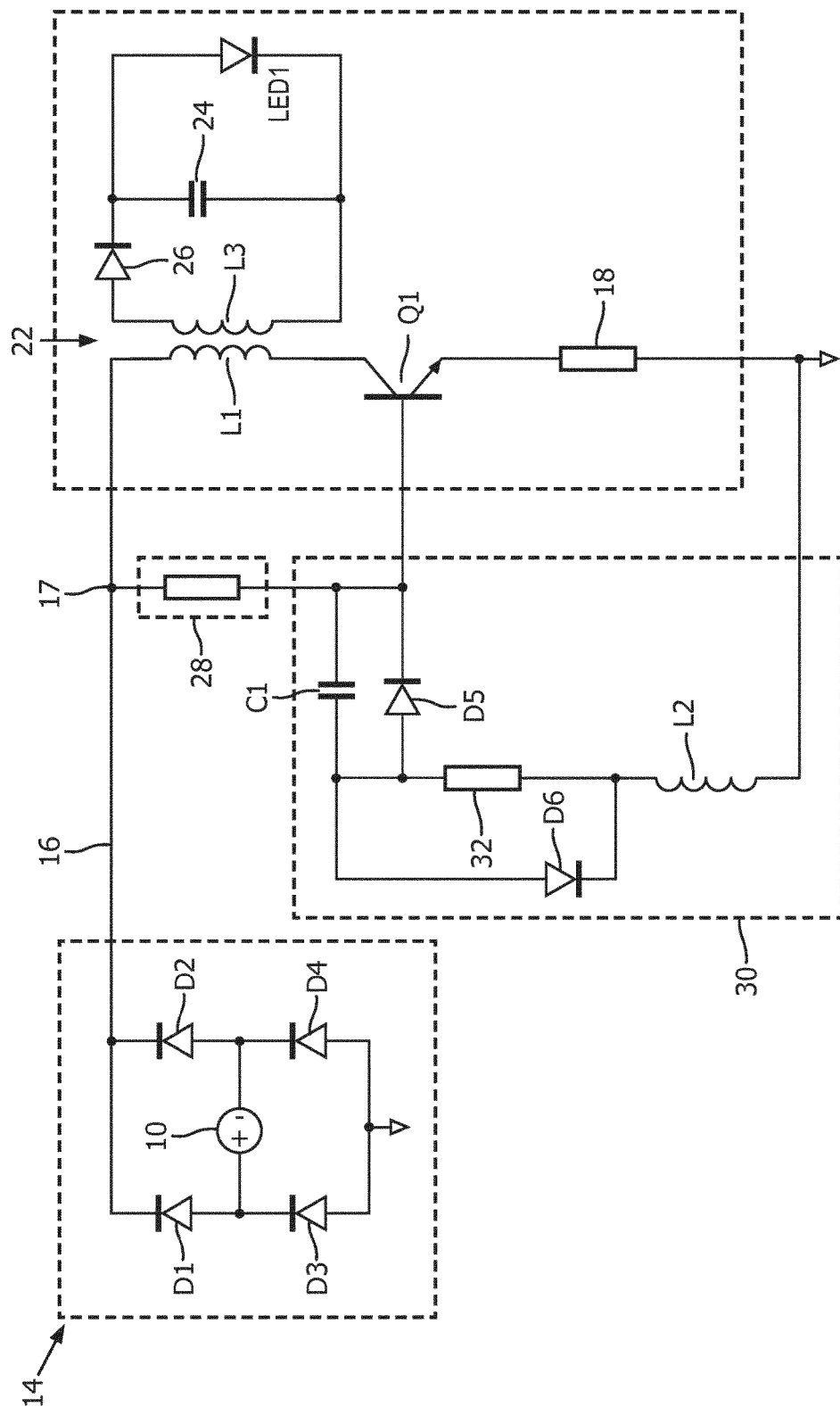
FIG. 1 shows an example of a known LED driver circuit based on a Ringing Choke Converter ("RCC")

A known RCC circuit is shown in FIG. 1. The circuit comprises a driver for driving an LED load shown as LED1, which in practice comprises a string or other network of LEDs.

The circuit consists of the mains supply 10. An EMI filter with inductor and capacitor is typically used, but is not shown in FIG. 1.

A diode bridge rectifier 14 using diodes D1 to D4 provides rectification with a rectified DC output line 17. A terminal 17 may be considered as the output of the rectifier.

The output 17 is connected to ground through the main primary side winding L1 of a transformer, a main converter switch implemented as a main transistor Q1, and a shunt resistor 18.

The transformer 22 functions as an isolating element, and also as the inductive element of the switch mode converter, which operates as a flyback converter. In particular, the secondary winding L3 forms the output stage, i.e. the flyback power stage, of the switch mode converter circuit with a capacitor 24 and diode 26. The circuit has an LED output for the LED load LED1.

The circuit includes a start-up circuit comprising a resistor 28 which charges up the base of the main transistor Q1 when the driver is turned on, and before the inductor current starts to ramp up. The base of the main transistor Q1 is otherwise controlled by a base drive circuit 30.

The base drive circuit 30 includes an auxiliary primary winding L2 of the transformer which delivers current to the main transistor, which is a high voltage bipolar transistor Q1. The voltage across the auxiliary winding L2 is proportional to the voltage across the main primary winding L1 due to the inductive coupling between the auxiliary primary winding L2 and the main primary winding L1.

During the on time of the main transistor Q1, the voltage across the winding L1 is proportional to the mains input voltage which in turn means that the current flowing through a base resistor 32 between the auxiliary winding L2 and the base of the main transistor Q1 is proportional to the (rectified) mains voltage. When the voltage at the output 17 is high, the voltage at the non-grounded terminal of the inductor L2 is high so that it delivers current to the base through the base resistor 32 and a forward biased base diode D5.

A base capacitor C1 is in parallel with the base diode D5. The base capacitor enables the main transistor to enter a saturation status quickly on start up and also enables fast switch off of the main transistor. The base diode D5 is used to clamp the voltage across the base capacitor which thus increases the base current of the main transistor.

A second diode D6 is in parallel with the base resistor 32. This diode plays a role in the fast switch off of the main transistor. The base charge of the main transistor Q1 is depleted via the base capacitor C1, the second diode D6 and the auxiliary winding.

The circuit components D5, D6 and C1 together form a primary side control circuit.

The current through the primary coil ramps up, and the coupling to the auxiliary coil L2 acts to rapidly turn on the main transistor Q1 to saturation. In particular, the auxiliary coil current injects a base current to the main transistor Q1 through the base resistor 32 and the base diode D5.

When the current reaches a certain level, the main transistor Q1 leaves the saturation region and the collector-emitter voltage increases. The primary winding voltage then will decrease, and the voltage on the auxiliary winding will also decrease, so that the main transistor is turned off.

Thus, the circuit functions in a cyclic manner switching the main transistor on and off. When the main transistor Q1 is off, the energy stored in the transformer is transferred to the secondary side, delivering an output current to the load (and to the capacitor 24). When the main transistor is turned on, the capacitor 24 instead delivers the output current to the load.

The circuit shown in FIG. 1 is well known, and there are many variations and additions to the known circuit, but which operate in the same general way, namely with an isolated flyback converter output stage, and using self-oscillation of a pair of inductors to implement the cyclic switching of the circuit.

For example, it is known that feedback can be used to influence the timing of the switching cycles, thereby providing level control, such as dimming control.

Feedback from the secondary side is known as secondary side control, whereas control making use only of signals present at the primary side is known as primary side control. In each case, the control is used to regulate the output current for a constant current control or to regulate the output voltage for a constant voltage control.

If this circuit is applied only to a single mains voltage, the base drive circuit power loss (in particular the power loss through resistor 32) will be acceptable.

However if the RCC driver is applied to a widely variable input mains voltage, such as universal mains, there exists too much power loss in the drive circuit 30 due to the input mains voltage range being almost three times as large. This means there is an increased current due to the higher voltage across L2 in a wide voltage input range.

Figure 2:
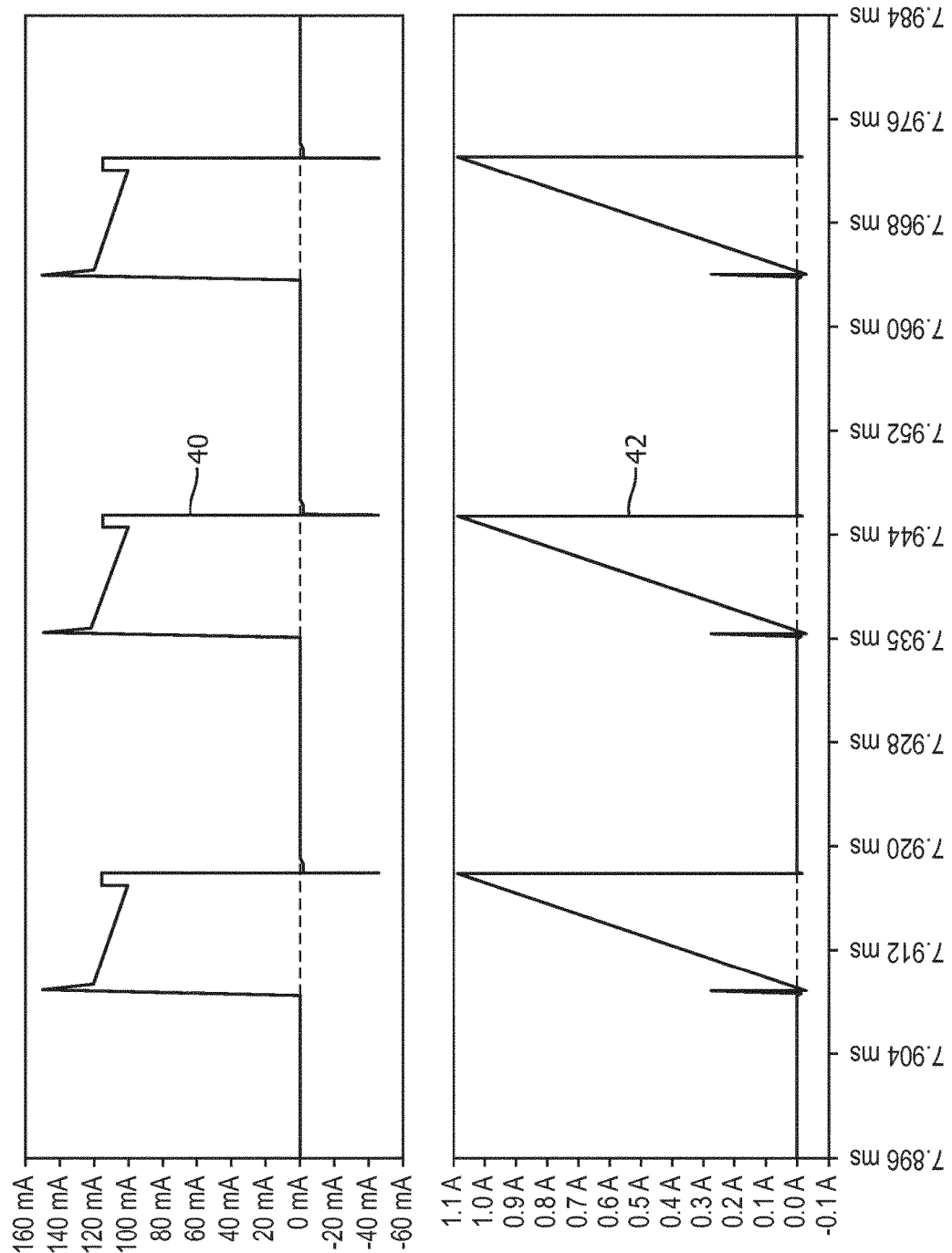
FIG. 2 shows a first set of graphs to illustrate the operation of the circuit of FIG. 1.

FIG. 2 shows the waveform of the current through resistor 32 (plot 40) and the collector current waveform (plot 42) of the main transistor Q1. It shows the high current during the on time of main transistor Q1 since the moment the main transistor Q1 turns on, the inductive voltage on L2 appears and directly applies to the base resistor 32. There is almost 400 mW power loss on the resistor 32 which will decrease driver efficiency.

To address this problem, embodiments of the invention propose regulating the voltage applied to the base resistor in a linear way and in turn provide a linearly increasing/ramping up current through the base resistor. The power loss on the base resistor is reduced.

Figure 3:
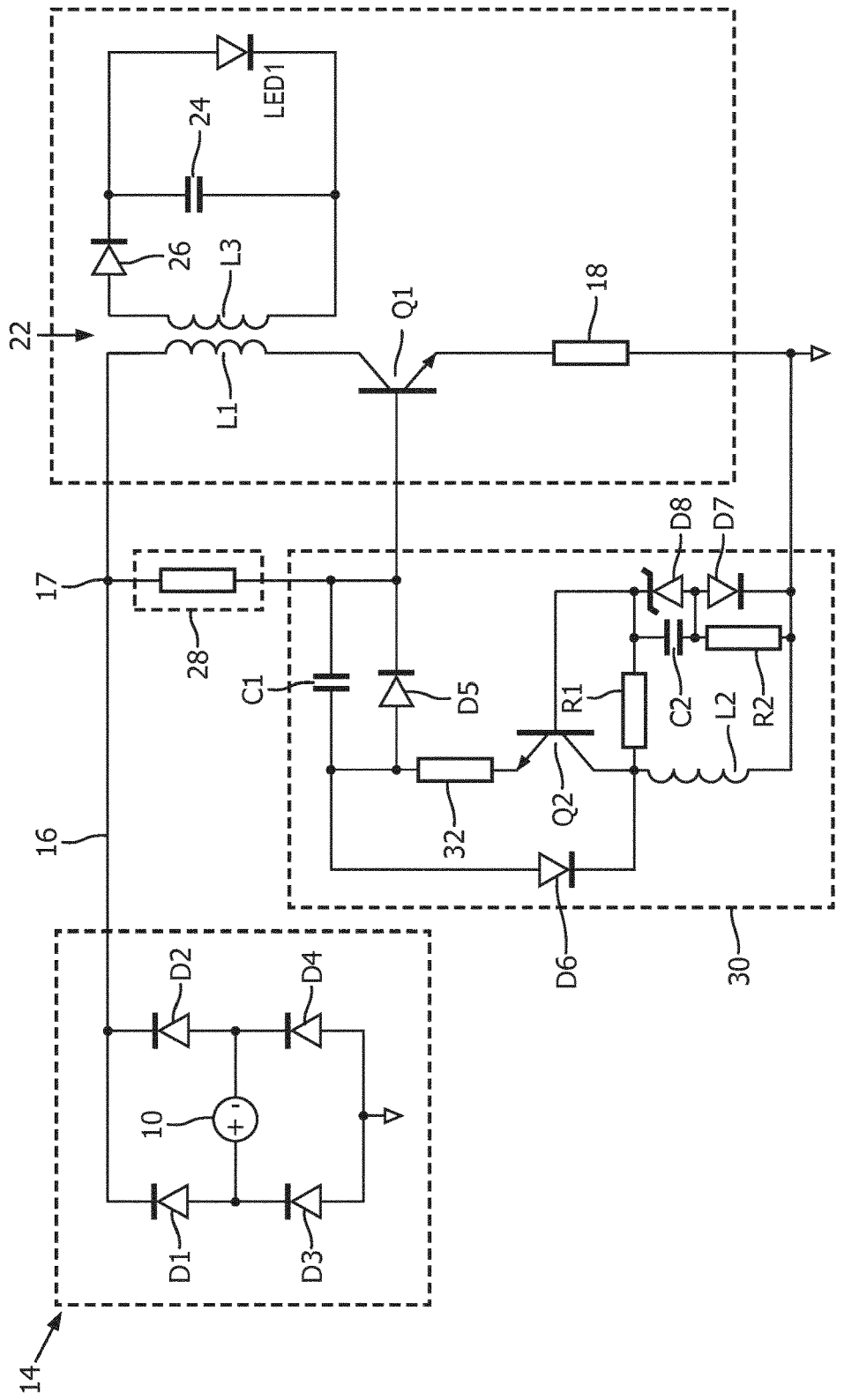
FIG. 3 shows an example of a modified LED driver circuit based on a Ringing Choke Converter ("RCC")

FIG. 3 shows an example of the circuit in accordance with the invention.

The circuit is the same as the circuit of FIG. 1 but with a modified drive circuit 30. The remainder of the circuit functions in the same way as the circuit of FIG. 1, and the same reference numbers are used. The description of the identical circuit parts is not repeated.

The base drive circuit comprises a ramp circuit R1, C2 for generating a ramp voltage from the auxiliary winding voltage across the winding L2. The ramp circuit applies a ramp voltage to the base of a control transistor Q2 connected between the auxiliary winding L2 and the base of the main transistor Q1. In particular, the control transistor Q2 is between the coil L2 and the base resistor 32.

The second diode D6 is then in parallel with the series combination of the control transistor Q2 (i.e. the collector-emitter path) and base resistor 32.

The control transistor functions as a voltage follower, with its emitter voltage at a fixed voltage difference to the ramp voltage applied to its base. By ramping the emitter voltage of the control transistor Q2, the base current flowing through the base resistor 32 is gradually increased. By ramping up the base current of the main transistor in this way, the losses arising as a result of the current flowing to the base of the main transistor are reduced.

The ramping of the base current is designed (by the circuit components) to match the ramped increase of the collector current of the main transistor Q1 in order to ensure sufficient base current of the main transistor Q1.

The ramp circuit comprises a series first resistor R1 and first capacitor C2, with the first resistor R1 connected at a first terminal to the auxiliary winding L2 and at a second terminal to a first terminal of the first capacitor C2. The other terminal of the first resistor R1 is connected to the base of the control transistor. This defines a capacitor charging circuit, which charges the capacitor C2 through the resistor R1 to generate a ramp voltage at the node between them. The voltage supply is from the inductor L2. This node is connected to the base of the control transistor Q2.

The second terminal of the first capacitor C2 is connected through a second resistor R2 to ground and through a first diode D7 to ground (with the diode in the forward direction towards ground). During charging of the node, the second diode D7 provides a conduction path rather than the second resistor R2 since the second resistor R2 has a high resistance value.

The first capacitor has a Zener diode D8 in parallel. This prevents the first capacitor C2 from being overcharged.

The second resistor R2 functions as a capacitor discharge circuit, so that after the ramp has been used to turn on the main transistor, the circuit is reset.

Figure 4:
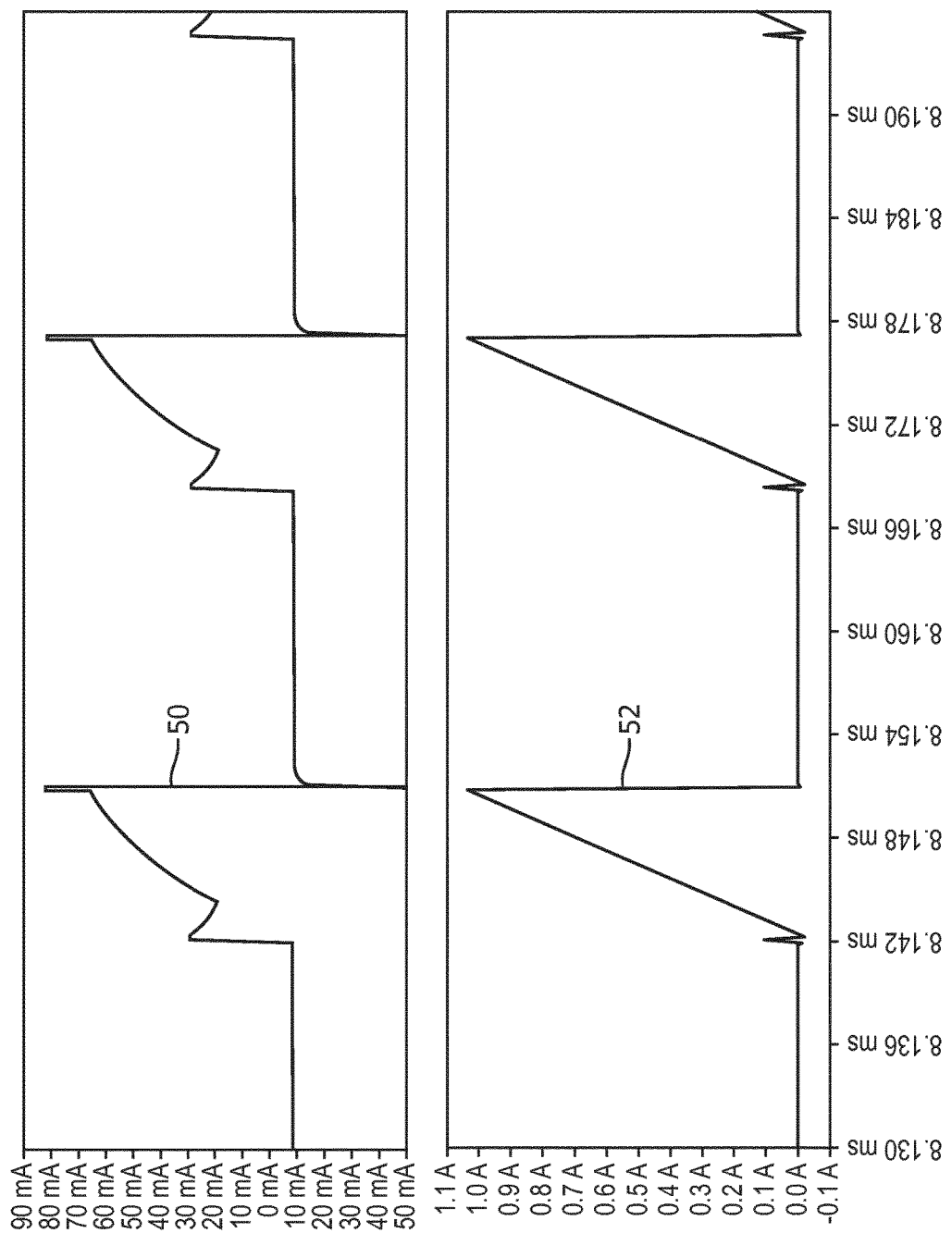
FIG. 4 shows a first set of graphs to illustrate the operation of the circuit of FIG. 3.

FIG. 4 shows the waveform of the current through resistor 32 (plot 50) and the collector current waveform (plot 52) of the main transistor Q1. It shows a reduced current during the on time of the main transistor Q1. The power loss on the resistor 32 is reduced to around 100 mW which will decrease driver efficiency.

The circuit implements a method by which a flyback ringing choke switch mode power converter is operated, using a start-up resistor between the DC line and the base of a main transistor and using a base drive circuit to generate a base current for the main transistor.

The base drive circuit is used to generate a ramp voltage from an auxiliary winding voltage. The ramp voltage is applied to a control transistor which is connected between the auxiliary winding and the base of the main transistor.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A driver circuit for driving an LED arrangement, said driver circuit comprising a switch mode power converter, the switch mode power converter being with a current-driven main switch and a sub-circuit for driving the main switch, the sub-circuit comprising:
   a supply adapted for providing a supply voltage;
   a ramp circuit connected to the supply, wherein said ramp circuit comprises a first capacitor adapted to be charged by said supply voltage so as to be with a linearly increasing voltage;
   a voltage follower connected to said first capacitor and adapted for providing a linearly increasing driving voltage that follows a linearly increasing voltage on said first capacitor as said first capacitor is being charged by said supply voltage; and
   a voltage to current conversion unit between said voltage follower and a control terminal of the main switch, for providing the control terminal of the main switch with a linearly increasing driving current that depends on the linearly increasing driving voltage as said capacitor is being charged by said supply voltage.

2. A driver circuit for driving an LED arrangement according to claim 1, wherein the driver circuit comprises a flyback ringing choke converter switch mode power converter, which switch mode power converter comprises:
   the main switch which comprises a main transistor;
   a primary winding in series with a collector and an emitter of the main transistor;
   a secondary winding which forms an inductor of a flyback output stage;
   and wherein the sub-circuit for driving the main switch is adapted to generate a base current for the main transistor.

3. A driver circuit for driving an LED arrangement according to claim 2, wherein the base drive circuit comprises:
   the ramp circuit for generating a ramp voltage from the auxiliary winding voltage; and
   the voltage follower, which comprises a control transistor connected with its collector and emitter between the auxiliary winding and the base of the main transistor, with the ramp voltage applied to the base of the control transistor.

4. A driver circuit as claimed in claim 3, wherein the ramp circuit comprises a series first resistor and the first capacitor, with the first resistor connected at a first terminal to the auxiliary winding and at a second terminal to a first terminal of the first capacitor, wherein the second terminal of the first resistor is connected to the base of the control transistor.

5. A driver circuit as claimed in claim 4, wherein the second terminal of the first capacitor is connected through a second resistor to ground.

6. A driver circuit as claimed in claim 4, wherein the second terminal of the first capacitor is connected through a first diode to ground.

7. A driver circuit as claimed in claim 3, wherein the voltage to current conversion unit comprises a base resistor in series between the emitter of the control transistor and the base of the main transistor.

8. A circuit as claimed in claim 7, further comprising a second diode in parallel with the series combination of the control transistor and the base resistor.

9. A driver circuit as claimed in claim 3, further comprising a start-up resistor connected to the base of the main transistor.

10. A driver circuit as claimed in claim 3, further comprising a base diode in series in forward bias direction from the emitter of the control transistor to the base of the main transistor.

11. A driver circuit as claimed in claim 10, further comprising a base capacitor (C1) in parallel with the base diode (D5).

12. A driver circuit as claimed in claim 3, wherein the first capacitor is in parallel with a Zener diode.

13. A LED circuit comprising:
   a driver circuit as claimed in claim 1; and
   an LED arrangement connected to the driver circuit.

14. A method of driving an LED arrangement, comprising:
   operating a current-driven main switch of a switch mode power converter, using a start-up resistor between a DC power line and the control input of the main switch and using a sub-circuit to generate a current for the control input of the main switch,
   wherein the method comprises, within the sub-circuit, generating a ramp voltage from a supply voltage using a ramp circuit which comprises a first capacitor adapted to be charged by the supply voltage so as to be with a linearly increasing voltage;
   applying the ramp voltage to a voltage follower to provide a linearly increasing driving voltage that follows a linearly increasing voltage on said first capacitor as said capacitor is being charged by the supply voltage; and
   converting the voltage to current thereby providing the control terminal of the main switch with a linearly increasing driving current that depends on the linearly increasing driving voltage as said capacitor is being charged by said supply voltage.

15. A method as claimed in claim 14, comprising operating a flyback ringing choke converter switch mode power converter, wherein the supply voltage is provided by an auxiliary winding.

* * * * *